United States Patent [19]

Miegel

[11] 4,042,619
[45] Aug. 16, 1977

[54] DERIVATIVES OF CARBOXY-TERMINATED POLYBUTADIENES

[75] Inventor: Ralph E. Miegel, Wilmington, Del.

[73] Assignee: E. I. Du Pont de Nemours and Company, Wilmington, Del.

[21] Appl. No.: 453,892

[22] Filed: May 3, 1965

[51] Int. Cl.$^2$ .................... C07C 101/26; C07C 69/52
[52] U.S. Cl. ............................ 260/482 P; 149/19.3; 149/19.9; 149/109.4; 149/122; 260/78.41; 260/485 G
[58] Field of Search ................... 260/78.4, 78.5, 78.41, 260/478, 482 P, 485 G, 485 H; 149/19, 19.3, 19.9, 109.4, 122; 526/11.2

[56] References Cited

U.S. PATENT DOCUMENTS

| 3,147,161 | 9/1964 | Abere et al. | 149/19 |
| 3,177,101 | 4/1965 | Vriesen et al. | 149/19 |

OTHER PUBLICATIONS

Chemical and Engineering News, Aug. 8, 1960, p. 53.

*Primary Examiner*—Leland A. Sabastian

[57] ABSTRACT

This invention relates to hydroxyalkyl esters of carboxy-terminated polybutadienes and to cetain high-energy derivatives thereof which are useful as binders in solid propellants, sheet explosives, etc.

7 Claims, No Drawings

DERIVATIVES OF CARBOXY-TERMINATED POLYBUTADIENES

Homopolymers and copolymers of butadiene are widely used as matrices or binders in formulations containing other ingredients. In the solid propellant art, binders of this type are blended with fuel and oxidant components, and the mixture is cured to form a solid elastomeric composition which is rigid enough to support its own weight. Although the oxidant and the fuel are often incorporated as separate components, there are advantages if the ingredients of the propellant contain both oxidizing and oxidizable groups within the same molecule. Thus, if the physical properties are acceptable, combustible polymeric binders which have such energy-rich molecular groups attached to the polymer chain may be preferred in propellant formulations designed for maximum impulse.

Recently, propellant binders containing a large percentage by weight of difluoramino groups have been of particular interest because such structures can impart a high specific impulse to propellant compositions. In the preparation of these high-energy binders, polybutadienes have been attractive because the residual unsaturation in the chain provides reactive sites to which difluoramino groups, as well as other oxidizing groups, can be attached by known chemical transformations. Such polymers, with a plurality of oxidizing groups, can contribute in a multiple way as a binder, a fuel, and an oxidant.

Normally, in the formation of solid polymeric compositions, the binder and the other ingredients are dissolved or dispersed during mixing and then the combination is cured by chain extension or cross-linking of the polymer matrix to form a product with the desired dimensional stability. Reactive sites for cross-linking may be introduced in random positions along the chain by copolymerization with suitable monomers. With homopolymers of butadiene, however, a preferred method is to place functional groups, such as carboxyl groups or hydroxyl groups, at the terminal positions on the polymer chain. Such carboxy-terminated polybutadienes may be cured with epoxides or imines and the hydroxy-terminated polymers may be cured with isocyanates.

In a solid propellant the ability to cure a formulation and obtain the necessary mechanical properties is of critical importance. In addition, however, the binder must be compatible with other ingredients combined to produce a composition of maximum potential energy. Numerous polymers which are suitable as curable binders are incompatible with the other components or fail to function in a formulation designed for the maximum theoretical energy release.

Experience in the formulation of solid propellants using difluoramino-substituted binders derived from available carboxy-terminated and hydroxy-terminated polymers of butadiene has established that such materials are difficult to cross-link and cure, and that the strength and elasticity of the cured compositions are inadequate for high-energy solid propellants. The energy-rich difluoramino groups, which are generally attached in vicinal positions by the addition of tetrafluorohydrazine to the residual double bonds in the polymer, must be introduced before the curing step. However, conventional imine curing agents are incompatible with the difluoramino compositions and the epoxide curing agents react very slowly with the carboxyterminated polymer to form binders which are weak and unsatisfactory. Also, the temperatures required for epoxide curing cause undesirable degradation of the difluoramino-substituted polymer and of propellant compositions containing it. Furthermore, in the preparation of conventional hydroxy-terminated polybutadienes it is difficult to obtain the difunctionally required for effective curing, and during the subsequent introduction of difluoramino groups, some additional hydroxyl groups are destroyed by side reactions and thus are unavailable as reaction sites for curing. In addition, the high content of pendant vinyl groups in conventional hydroxy-terminated polybutadines leads to competing cyclization reactions during the difluoramination and the product which is obtained loses HF readily.

This invention provides novel hydroxyalkyl-terminated polybutadienes, which are prepared by catalytically esterifying a carboxy-terminated polybutadiene with a polyhydric alkanol. Unexpectedly, the free hydroxyl groups in the hydroxyalkyl radical of the terminal ester moieties are resistant to the degradation observed during the difluoramination of conventional hydroxyterminated polybutadienes. Moreover, these hydroxyalkyl esters and their difluoramino derivatives are readily cured by conventional methods, e.g., with isocyanates, at moderate temperatures.

The expression "carboxy-terminated polybutadienes" is conventionally used herein to refer to polymeric butadiene hydrocarbons terminally substituted with carboxy groups, and "polyhydric alkanol" means a monomeric alkanol having at least two hydroxy groups. Thus, the hydroxyalkyl esters of this invention are polybutadienes having terminal

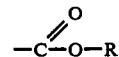

groups wherein R is hydroxyalkyl. For the sake of simplicity, these esters are sometimes hereinafter referred to as hydroxyalkyl-terminated polybutadienes.

Depending on the method of polymerization, butadiene molecules combine by 1,2-addition, producing a polymer with appended vinyl groups, and by 1,4-addition, producing a polymer with cis- and trans-configurations at the points of unsaturation in the linear chain. In general, commercial polybutadienes contain a mixture of these structures. While the polybutadienes useful in this invention may contain some vinyl-type unsaturation, the preferred compositions are linear polymers containing greater than about 70%, by weight, of 1,4-configuration. Furthermore, polybutadienes with a high percentage of the cis-1,4-configuration are preferred since a higher plurality of difluoramino groups can be introduced by addition.

In general, the solubility of polymers decreases as the molecular weight and the degree of cross-linking increases, and polymers of high molecular weight tend to swell rather than dissolve. In the manufacture of propellants it is preferable to utilize binders which can be dispersed thoroughly or dissolved in a mixing step, and then to chain-extend and crosslink the polymer matrix during a subsequent cure cycle. Also the introduction of difluoramino groups and other oxidizing groups by substitution proceeds more readily if the polymer can be dissolved in a solvent. Accordingly, the carboxy-terminated polybutadienes preferred for use in this invention are liquid polymers of low molecular weight, usually in the range of about from 1000 to 5000. Higher molecular weight polymers give energetic binders which may be used in the form of plastisol formulations.

The hydroxyalkyl-terminated polymers of this invention can also be employed as molding compositions to be cured by conventional techniques.

Several carboxy-terminated polybutadienes of various molecular weights are available commercially under designations such as Butarez CTL (Phillips Petroleum Co.) Hycar CT (B.F. Goodrich), HC Polymer (Thiokol Corp.), and ASRC Polymer (American Synthetic Rubber Corp.).

Any polyhydric alkanol may be used to esterify carboxy-terminated polybutadienes according to this invention; however, alkanols of up to 10 carbons are more readily available and thus are preferred. Exemplary alkanols are glycerine, propylene glycol, 2-methyl-2-(hydroxymethyl)-1,3-propanediol, 2-ethyl-2-(hydroxymethyl)-1,3-propanediol (trimethylolpropane), 2-ethyl-1,3-hexanediol, 2-propyl-1,3-heptanediol,1,3-propanediol and ethylene glycol. Mixtures of esters of trimethylolpropane and ethylene glycol give binders having particularly desirable properties.

The preferred hydroxyalkyl-terminated polybutadienes of this invention, i.e., those prepared from the above preferred classes of carboxy-terminated polybutadiene and polyhydric alkanol, have a molecular weight of about from 1100 to 5400.

The acid-catalyzed esterification of the carboxy-terminated polybutadiene is of the type generally referred to as Fischer esterification (cf. Fieser and Fieser, Organic Chemistry, D.C. Health & Co., Boston 1944, p. 178). Although p-toluenesulfonic acid is the preferred catalyst from the standpoint of expense, solubility and minimizing corrosion problems, other strong acids, e.g. sulfuric or hydrochloric acid can be employed. The esterification is carried out in a solvent such as toluene, which both reduces the viscosity of the polymer-alcohol mass and removes by azeotropic distillation the water formed during esterification.

Some hydroxyalkyl-terminated polybutadiene of this invention will be obtained when the ratio of moles of polyhydric alkanol to carboxy groups in the precursor polybutadiene is at least 1; however, for substantially complete esterification of the carboxy groups without chain extension, a ratio of at least 2:1 should be employed and is preferred. When the esterified carboxy-terminated polybutadines are to be difluoroaminated and then employed as binders in propellant compositions, their residual carboxy content should be less than about 10% of the total carboxy content before esterification; otherwise, curing of the binder will present the aforementioned problems normally associated with curing conventional difluoroamino-substituted, carboxy-terminated, polybutadienes. If desired, unreacted carboxy-terminated polymer can be removed from the product by base extraction from an organic solvent.

The reaction of tetrafluorohydrazine with a hydroxyalkyl-terminated polybutadiene to give the difluoramino-substituted compounds of the invention is effected in an inert solvent for the polybutadiene and the tetrafluorhydrazine. Any solvent not reactive with the reaction components under the conditions used may be employed. Preferably, the solvent is low-boiling so that it can be removed easily from the reaction product. Compounds particularly useful as solvents are methylene chloride and chloroform.

The temperature at which the difluoroamination reaction is effected will vary according to other reaction variables and the stability of the particular compound being prepared but preferably will be within the range from about 80° to about 125° C. At lower temperatures the reaction rate is impractically slow unless exceedingly high pressure is used, and at temperatures higher than 125° C, degradation of the product usually takes place. Although the reaction can be effected over a wide range of pressures depending on the solubility of the components, superatmospheric pressure, for example at least about 200 psig, is desirable in order to achieve a reasonably high reaction rate and prevent any low-boiling solvent from evaporating. Generally there is no advantage in using pressures above about 200 psig.

When the difluoroaminated, hydroxyalkyl-terminated polymers are to be used as high-energy binders, they should have a difluoroamino content of at least about 20%, preferably at least 40%, by weight. Such polymers will have molecular weights of up to about 10,000 when prepared from the preferred polybutadiene precursors. For maximum addition of difluoramino groups, at least about two moles of tetrafluorohydrazine per double bond in the hydroxyalkyl-terminated polybutadiene should be used.

The hydroxyalkyl-terminated polymers of this invention, including those bearing difluoroamino groups, can be cured (i.e. chain-extended and cross-linked) by conventional techniques. The preferred curing agents are aromatic diisocyanates such as 2,4-toluene diisocyanate, methylene-bis(4-phenyl) diisocyanate, and 4,4'-diisocyanatobiphenyl and its 3,3'-dimethyl or 3,3'-dimethoxy derivatives.

The invention is illustrated by the following examples.

EXAMPLE 1

One preferred starting material is a commercial carboxy-terminated butadiene polymer HC-434 manufactured by the Thiokol Corp. A typical sample has a titrimetric carboxyl equivalent of 0.0509 per 100 g, (i.e., 0.0509 carboxyl groups per 100 g polymers), a bulk viscosity of 211 poises at 25° C, a density of 0.9, and an average molecular weight of 3930. The configuration, as analyzd by infrared spectroscopy using the method of Silas et al. (Anal. Chem. 31, 529 (1959)), is 48.5% 1,4-trans, 35% 1,4-cis, and 16.5% 1,2-vinyl.

A mixture of 200 g of HC-434 polymer, 43 g of 2-ethyl-2-hydroxymethyl)-1,3-propanediol (trimethylolpropane), 1.8 g of p-toluenesulfonic acid, and 200 ml of toluene is refluxed for 4.8 hrs during which the water produced is separated in a trap. After cooling, 1.5 lb of ether is added and the mixture is washed ten times with water to remove excess trimethylolpropane and catalyst. The ether layer is dried with MgSO$_4$, filtered, and then the ether-toluene solvent is removed by vacuum distillation, leaving the hydroxyalkyl-terminated polymer as a residue. The presence of terminal hydroxyalkyl groups is confirmed by infrared analysis. Less than 10% of the original carboxyl groups remain.

EXAMPLE 1

A mixture of 200 g HC-434 polymer having a titrimetric carboxy equivalent of 0.0509 per 100 g, 30 g of ethylene glycol, 1.8 g p-toluenesulfonic acid, and 200 ml of toluene is refluxed for 4.5 hrs during which the water produced is separated in a trap. After cooling, the mixture is washed 10 times with water to remove excess glycol and catalyst. The moisture in the solvent layer is removed with $MgSO_4$ and filtered. Excess solvent is removed by vacuum distillation at 80°–85° C, leaving as a residue the hydroxalkyl-terminated polymer having a titrimetric carboxyl equivalent of about 0.002 per 100 g, i.e., about 3.9% of the original carboxyl groups remain.

EXAMPLE 3

A. To prepare a high-energy propellant binder, the hydroxalkyl-terminated polybutadiene prepared according to Example 1 is reacted with excess tetrafluorohydrazine. In a stirred autoclave a solution of 5 g of this polymer in 40 ml of methylene chloride is treated with tetrafluorohydrazine. In a stirred autoclave a solution of 5 g of this polymer in 40 ml of methylene chloride is treated with tetrafluorohydrazine at an initial pressure of 200 psig at 30° C. The temperature is increased and maintained at 100° C for 1–1.5 hrs until the pressure drops to a constant level. The solution is filtered, and then n-pentane is added to precipitate the difluoramino-substituted polymer. The product contains 11.7% N and 32.3% F by weight and has a fluorine to nitrogen molar ratio of 2.03. There is no evidence of decomposition and loss of HF during storage. Infrared spectral evidence confirms that the difluoramino groups are present as vicinal substituents, predominantly.

B. In contrast, the product obtained when a conventional hydroxy-terminated polymer is used is less satisfactory as a high-energy binder. To illustrate, a polybutadiene is prepared by polymerization of the monomer with sodium napthalenide, followed by chain termination through reaction with ethylene oxide. The hydroxy-terminated polymer, as analyzed by the method of Silas et al., contains 87.8% 1,2-vinyl, 1.5% 1.4-trans, and 11% 1,4-cis configuration, and has a molecular weight of about 1700. In a stirred autoclave a solution of 3 g of this polymer in 75 ml of acetone is treated with tetrafluorohydrazine at an initial pressure of 200 psig. The temperature is increased and maintained at 100° C for 2 hrs. The product. recovered by precipitation with water, contains 13.8% N and 36.5% F by weight and has a fluorine to nitrogen molar ratio of 1.95. A strong infrared absorption at 12.3 $\mu$ establishes that many of the difluoroamino groups in the polymer are isolated, non-vicinal substituents, probably introduced through competing cyclization reactions of the pendant vinyl groups during the addition reaction. The rapid etching of glass containers shows that HF was evolved by decomposition at room temperature.

EXAMPLE 4

An 0.5 g sample of a hydroxyalkyl-terminated polymer with appended difluoramino groups, prepared according to Example 3A, is plasticized by mixing with 1 g of 2,3,3',4'-tetrakis(difluoramino)propyl butyrate. To this homogenous mixture was added a stoichiometric amount (i.e., the amount theoretically required to react with all hydroxyl groups, 6% by weight of the polymer) of toluene-2,4-diisocyanate, and a trace of dimethyltin dichloride catalyst and the mixture is cured for 16 hrs at an average temperature of 49° C. The resulting gel is soft and moderately elastic and does not show any liquid exudation.

Cured polymers with similar characteristics are obtained when the plasticizer used is 1,2,4,5-tetrakis(difluoramino)pentane or 1,2,5,6-tetrakis(difluoramino)hexane.

EXAMPLE 5

A sample of the difluoramino-substituted hydroxyalkyl-terminated polybutadiene prepared as in Example 3A is utilized as a binder in a solid propellant formulation. A formulation containing 19.5% of the polymer, 42.3% 1,2,5,6-tetrakis(difluoramino)hexanexdiol-3,4-diacetate (plasticizer), 1.3% toluene 2,4-disocyanate, 34.7% ammonium perchlorate (oxidizing agent), 2.2% boron (fuel), and a trace of dimethyltin dichloride catalyst is mixed under vacuum and then cast in a sample mold ⅛ in. thick. After curing at 40° C for 30 hrs. the propellant composition has good uniformity, excellent mold definition, and there is no liquid exudation. Differential thermal analysis indicates only minor decomposition starting at 93° C and a major decomposition peak at 141° C. In a general stability test, the composition produces no gas evolution during 136 hr at 50° C. In an impact test with a dropping weight the 50% point is 462 kg-cm.

A sample from a similar formulation cured for 24 hrs at 52° C is tested to obtain its mechanical properties. At a strain rate of 7.4 in./in./min. and a temperature or 72° F, the maximum stress is 70 psi, the strain at maximum stress is 54.8%, and the modulus is 111 psi. The burning rate of a ⅛ × ⅛ × 2-in. strand at 1000 psi is 0.52 in./sec with a pressure exponent of 0.36.

EXAMPLE 6

A mixture of the hydroxyalkyl terminated polybutadienes prepared as in Examples 1 and 2 is used as a binder in a solid propellant formulation. The formulation containing 8.6% of the ethylene glycol terminated polybutadiene (Example 2), 0.9% of the trimethylol propane terminated polybutadiene (Example 1), 10.0% dibutyl sebacate (plasticizer), 0.5% toluene-2,4-diisocyanate, 74.9% ammonium perchlorate, 5.0% boron and 0.1% dimethyltin dichloride is mixed under vacuum then cast under vacuum into a 1 × 2 × ⅛-in. mold. After curing at 43° C for 18 hours the composition exhibits uniformity, excellent strength and mold definition and no liquid exudation. Differential thermal analysis shows minor internal heating starts at 246° C leading to a detonation at 317° C. In a gas evaluation test the propellant evolves no measurable gas in 120 hours at 60° C.

EXAMPLE 7

A mixture of 1.20 g (11.8%) of the $N_2F_4$ adduct of ethylene glycolesterified HC polymer 434 prepared as in Example 2, and 0.30 g (3.0%) of the $N_2F_4$ adduct of trimethylolpropane-esterified polymer prepared as in Example 1, is combined with a methylene chloride solution of 1.50 g (14.8%) of 1,2,3-tris[1,2-bis (difluoroamino)ethoxy] propane (energetic plasticizer), 0.06 g (0.6%) of 2,4-tolylene dissocyanate, and 0.10 g (1.0%) of dibutyltin acetate catalyst. The mixture is mixed and stripped of solvent in vacuo, then is combined with 7.00 g (68.9%) of ammonium perchlorate (ground to 41 $\mu$), mixed again in vacuo, and extruded into a curing mold. The mixture is cured for 55 hours at 50° C in an atmosphere of nitrogen. The cured slab is smooth, firm, and well molded, and has a tensile strength of 92 lb/sq in. at an elongation of 7.6%. The propellant has an autoignition temperature of 135° C, an impact sensitivity of 140 kg cm, and is insensitive to initiation by static electricity or blasing caps.

I claim:

1. Polybutadiene terminated with —C(O)OR groups, R being hydroxyalkyl.

2. A difluoramino derivative of a polymer of claim 1, said derivative having a difluoramino content of at least about 20% by weight and having the difluoramino groups appended to the polymer chain.

3. A polybutadiene of claim 1 wherein R contains up to 10 carbons.

4. A polybutadiene of claim 3 having a molecular weight of about from 1100 to 5400.

5. An ester of a polyhydric alkanol of up to 10 carbons and carboxy-terminated polybutadiene having a molecular weight of about from 1000 to 5000 and greater than about 70% by weight 1,4-configuration.

6. A difluoramino derivative of an ester of claim 5, the difluoroamine groups being appended to the polymer chain and constituting at least 40% by weight of the derivative.

7. An ester of claim 5 wherein said alkanol is selected from the groups consisting of ethylene glycol and trimethylolpropane.

* * * * *